…

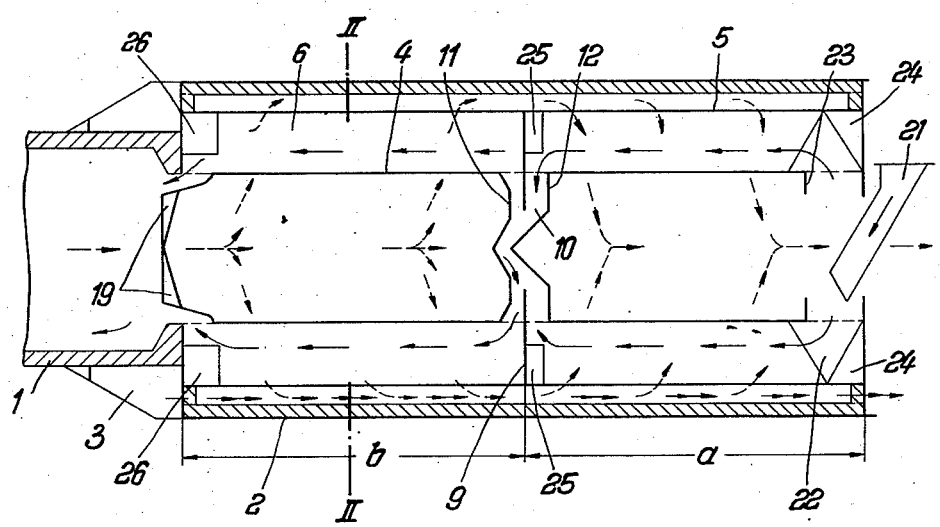
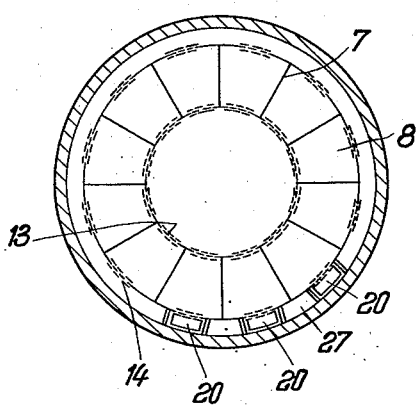
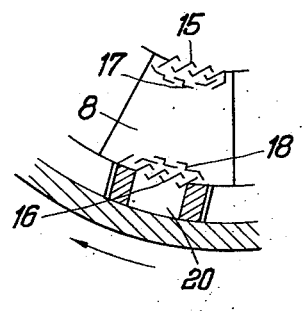

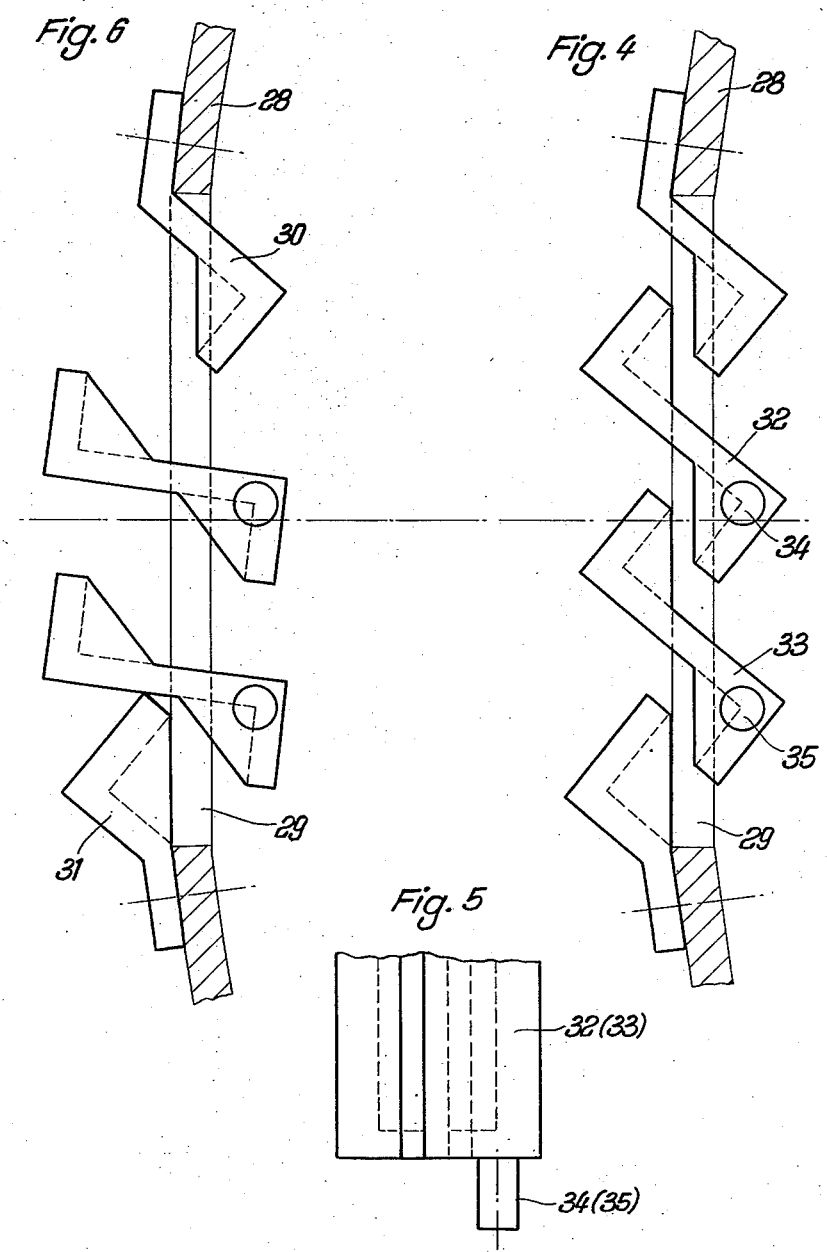

United States Patent Office 2,809,024
Patented Oct. 8, 1957

2,809,024

ROTARY DRUM APPARATUS FOR GASEOUS TREATMENT OF DIVIDED MATERIAL

Josef Simon, Florsheim (Main), and Johannes Kiesbauer, Bad Hersfeld, Germany

Application January 28, 1955, Serial No. 484,716

Claims priority, application Germany January 29, 1954

11 Claims. (Cl. 263—32)

The invention relates to rotary drum apparatus for gaseous treatment of divided material. The term gaseous treatment is to be understood to include treatment with air. Apparatus of this kind is used for drying, firing, calcining, sintering and cooling substances such as cement, clinker, lime, gypsum, magnesite, dolomite and other alkaline-earth carbonates and the like. The present invention aims at improving the heat economy of apparatus of this kind while at the same time enabling the material treated to be conserved as far as possible in order to prevent dust nuisance which would otherwise occur. Mechanical arrangements for the solution of this problem must be as simple as possible.

According to the invention the problem is solved by bringing the hot gases or cooling air particularly intensively into contact with the material to be treated, a particularly high relative speed being produced between the material to be treated and said gases or air. The invention is to be used preferably with rotary drum apparatus in which the material is charged preferably in granular form or in a larger or smaller range of grain sizes.

The invention accordingly consists in that the apparatus comprises an outer cylindrical casing with two concentric built-in cylindrical shells disposed at a radial distance from each other, the annular space between these drums being sub-divided into separate chambers by longitudinal walls. The hot gas or air by the aid of slot arrangements in the shells passes in a substantially transverse flow through the material moving along the said chambers. Gas discharge ducts are provided between the outer one of the cylindrical shells and the said casing, in order to allow the gases or the cooling air to escape.

The inner shell is preferably sub-divided in its length by two transverse walls spaced from one another, and an annular baffle wall mounted in the outer shell extends into the space between these two transverse walls. Transverse walls of this kind with baffle walls projecting into the space between them can be repeatedly disposed one behind the other in one apparatus. The purpose of these arrangements is that the material to be treated should not pass through the said chambers solely in the longitudinal direction, but that it should be caused to make its way transversely at the place or places where the transverse walls occur, in order to be introduced into the following longitudinal chambers and to be conveyed on in such chambers in the longitudinal direction of the rotary drum apparatus. In a cylindrical rotary kiln for the firing of cement and the like, a transverse wall partitioning of this kind is preferably provided at the transition from the predrying zone to the calcining zone.

Importance is attached to the fact that the individual longitudinal chambers should have substantially smooth limiting walls which are interrupted solely by the slot arrangements in the shells.

It is thus achieved that the material to be passed through the apparatus is treated in an extremely non-injurious manner. The several elements of the rotary drum apparatus may be produced from a suitable material depending on the working temperatures, steel or refractory bricks being suitable materials. The said chambers may be charged with the maximum possible amounts of divided material per unit of time, and when burnt gases, for example from a rotary kiln, are passed in transverse flow through the material in such chambers, the transmission of heat to the material takes place in a correspondingly high degree, so that the risk of the several elements of the apparatus being impaired by the burnt gases is considerably reduced thereby.

The slot arrangements in the said shells may be covered by louvre-like, inclined individual strips. These strips may have a Z-shaped cross-section and be disposed at an angle of slope such that passage of the divided material through the slot arrangements is impossible.

When the material to be treated contains water, and when this is the case with a material charged in granular form, it may happen that in the pre-drying of such material in a rotary kiln, clogging of the slots between the individual strips will occur, so that the passage of burnt gases through the slot arrangement is obstructed. In order to avoid this the individual louvre strips may be constructed to be movable. For this purpose the said strips may be rockably mounted outside their centres of gravity so that on rotation of the drum apparatus the said individual strips automatically pass from a closed position into an open position and conversely return automatically into the closed position. In this case the individual strips are advantageously made so long or so wide that they are capable, on corresponding rotation of the drum, of striking one against another in the open position, or are capable, on reaching the closed position, of lying with their outer edges on the longitudinal edges of the slot to be covered. These movements of the individual strips produce an impact effect which is sufficient to remove any portions of the material to be treated which are adhering to such strips and thus always keep the slots clear for the passage of burnt gases, cooling air, or the like. The movable arrangement of these louvre strips is at the same time such that the said individual strips assume their closed position when the material to be treated lies on the individual strips on corresponding rotation of the drum.

The louvre devices in turn may be covered towards the internal space of the individual longitudinal chambers by cover strips or baffle assemblages.

It is advisable to provide, at the inlet and outlet ends of the individual longitudinal chambers and at the baffle wall extending between the aforesaid transverse walls, lifting devices known per se, which are adapted to effect feed or removal of the material as uniformly as possible. It is also advisable to provide in the inner cylindrical shell or in front of the inlet thereto means adapted for imparting a swirl to the entering gases or air. In this way, by assisting the natural induced draught, whether a flue draught or an artificially created suction, the transverse flow of the gases or air through the material to be treated in the individual longitudinal chambers is promoted. In the annular space between the outer cylindrical shell and the cylindrical casing, longitudinal passages can be provided, through which, for example, fresh air may flow, such flow being independent of the outflow of gases or air through the aforesaid ducts. This affords the possibility of additional cooling of the several elements within the casing, which may otherwise be endangered by the hot gases.

An arrangement according to the invention may be assembled so as to form a unit with a rotary drum kiln, but the apparatus according to the invention may also be mounted as a separate drum apparatus in relation to the rotary drum kiln and such separate apparatus may be given an independent drive.

When treating a sludge preparation, such as is known in the production of cement, there may be disposed in front of the individual longitudinal chamber arrangement a rotary drum part provided in manner known per se with lifting devices, built-in chains or the like, so that the material to be treated is already suitably predried in the antechamber of such drum part before entering the individual longitudinal chambers.

Constructional examples in accordance with the invention are illustrated in the annexed drawings, in which:

Figure 1 is a diagrammatic longitudinal section of a rotary drum apparatus connected to the upper end of a partially shown cylindrical rotary kiln for the roasting of cement.

Figure 2 is a cross-section on the line II—II in Figure 1.

Figure 3 shows a portion of the cross-section in Figure 2 drawn to a larger scale.

Figure 4 is a cross section, also to a larger scale of a louvre arrangement comprising rockable strips, the latter being shown in a closed position.

Figure 5 is a plan view of a portion of one of the rockable strips seen in Figure 4, and Figure 6 is similar to Figure 4 but showing the rockable strips in the open position.

Referring to Figure 1, to the upper end of a cylindrical rotary kiln 1 there is connected the outer cylindrical casing 2 of a drum apparatus which casing has a larger diameter than the said kiln 1. The connection of the casing 2 to the cylindrical rotary kiln 1 is made with suitable, radially disposed connecting webs 3. Two concentric cylindrical shells 4 and 5 are fixedly mounted one within the other in the casing 2. The annular space 6 between the two shells 4 and 5 is subdivided into individual longitudinal chambers 8 by longitudinal radial walls 7, see also Figures 2 and 3.

The inner cylindrical shell 4 is divided into two elongated portions. The inner ends of these portions are closed by transverse walls 11 and 12 and these walls are spaced apart to provide an intermediate space 10. At the transition from a pre-drying zone *a* to a calcining *b*, an annular baffle plate 9 is provided within the shell 5, and this baffle plate 9 extends into the space 10 between the transverse walls 11 and 12.

The cylindrical shells 4 and 5 are provided with slot arrangements, which are diagrammatically indicated in Figure 2 by the references 13 and 14. As is clear from Figure 3, these slotted arrangements are provided with louvre devices comprising inclined individual strips 15 and 16. The angle of slope of these strips 15 and 16 is so selected that, on rotation of the drum 2 in the direction shown in Figures 2 and 3, the material moved in the individual longitudinal chambers 8 cannot pass through the said slot arrangements. In order to increase the dependability in this respect, the louvres formed by the strips 15 and 16 may be guarded by baffle or cover strip assemblages 17 and 18 disposed in the chambers 8 inwardly of the said louvres. Inclined ventilator vanes 19 impart a twisting motion or swirl to the burnt gases which pass out from the rotary kiln 1 and which are to enter the interior of the inner cylindrical shell 4. The path of these burnt gases is indicated by broken arrows in Figure 1. The burnt gases thus emerge from the rotary kiln 1 and after receiving a swirling motion from the vanes 19, enter the inner space of the shell 4 of the calcining zone *b*. The gases then pass radially outwards through the slot arrangements 15 and 16 and finally enter outflow ducts 20.

As will be seen from Figures 2 and 3, the ducts 20 are formed by radial walls built in between the outer cylindrical shell 5 and the interior of the outer casing 2 and each duct 20 coincides with a slot arrangement associated with a respective longitudinal chamber 8. In the calcining zone *b* the hot gases pass outwardly from the central space, through the slot arrangements 13 and 14 and into the ducts 20. In their passage through the chambers 8 the gaseous flow is consequently mainly transversely of the longitudinal flow of divided material along the chambers 8. In the pre-drying zone *a* the gases flow conversely, that is to say from outside inwards, the flow being from the ducts 20 through the slot arrangements 14 and 13 (thereby passing through and pre-drying the material in the longitudinal chambers 8) and finally escaping from the inner space of the inner cylindrical shell 4, the open outer end of the latter, for example, being in communication with a flue or chimney. The material to be treated is passed through the apparatus in the reverse direction, as indicated in Figure 1 by the solid arrows. The said material is supplied through a chute 21 and is preferably in granular form. The chute 21 delivers the material at 22 so that it can pass into the annular space between the two cylindrical shells 4 and 5. At the charging end, the inner shell 4 is provided with a baffle flange or ring 23, in order that the material charged in cannot pass into the interior of such inner shell 4. Owing to the slope of the entire rotary drum apparatus and its rotation, and further owing to the assistance of lifting blades 24, the material then passes into the individual longitudinal chambers 8, and is uniformly distributed over said chambers. The material then passes through the pre-drying zone *a* along the individual longitudinal chambers 8 as far as the baffle wall 9. At this baffle wall 9, with the assistance of blades 25, the material is caused to move into the chamber 10 between the two transverse walls 11 and 12. The possibility of charging the individual longitudinal chambers with as great an amount of material as possible is assisted by one or a plurality of baffle arrangements of this kind. After the material has passed through the transverse space 10, it passes into the individual longitudinal chambers 8 of the calcining zone *b* and is finally conveyed by the lifting devices 26 into the inlet end of the cylindrical rotary kiln 1.

The walls of the individual longitudinal chambers 8 are as smooth as possible; no moving separate parts are situated therein. The material to be treated and charged in granular form is thus protected as completely as possible and the hot gases pass through this material in the individual longitudinal chambers in transverse flow as already explained. Owing to the absence of moving built-in parts, the danger of dust is greatly reduced and in this respect the mode of operation of this apparatus ensures instead that the material to be treated itself acts as a filter finally allowing the waste gases to escape from the apparatus in a state as free from dust as possible.

As is clear from Figure 2 in particular, further longitudinal passages 27 are provided between the individual ducts 20 in the annular space between the outer casing 2 and the outer cylindrical shell 5. The said longitudinal passages 27 may be utilized, depending on the temperatures prevailing, to serve for the passage of fresh air to be used, for example, as cooling air. The passages 27 and 20 are not connected or in communication with one another in any way.

When the apparatus is to be used, for example, as a cooling drum for cylindrical rotary cement kilns, the passages 27 may also be utilised for bringing fresh air at the lowest possible temperature into the section *a*, by-passing section *b*, in order that fresh air can also be brought to the hot clinker so as to increase the proportion of vitreous parts in the clinker through the chilling caused thereby. The path of this fresh air is indicated in Figure 1 by double arrows. Similarly, partial currents can be led off in other applications in order to dry wet material, which tends to adhere to the surface.

In Figures 4 and 6, 28 indicates the sheet metal of one of the two cylindrical shells 4 and 5. In this sheet metal there is an elongated slot 29. At each end of this slot 29 there is a fixedly mounted louvre strip 30 and 31 which may be riveted to the sheet metal 28. These strips 30 and 31 have an angular cross-section.

Between the strips 30 and 31 are situated further louvre strips 32 and 33, which are movably or pivotally mounted. In the example illustrated, these strips 32 and 33 are rockably mounted by pivot pins 34 and 35 which have bearings at the longitudinal edges of the elongated slot 29. The said pins are situated outside the centre of gravity of the individual strips 32 and 33, that is to say the pivotal axis does not coincide with the longitudinal axis passing through the centres of gravity of cross sections of the said strips.

On suitable rotation of the drum apparatus, the rockable strips 32 and 33 may first assume a closed position shown in Figure 4. On further rotation of the drum the strips 32 and 33 may open automatically to the position shown in Figure 6. By this rocking motion of the individual strips, particularly by their striking one against another or by the movable strips 33 striking against stationary strips 31, as seen in the lower part of Figure 6, or by the movable strips striking, on returning into the closed position, against the wall 28 on the shell, vibrations or impacts occur which bring about the removal of any adherent particles of material.

We claim:

1. Rotary drum apparatus for the treatment of divided material with gas in two successive stages, said apparatus comprising, in combination, a rotatable cylindrical casing, outer and inner cylindrical shell structures mounted concentrically in said casing, said casing defining an outer annular space around the outer of said shell structures, the inner of said shell structures being defined by two shell portions disposed in axial alignment with a space between the adjacent ends thereof, and said outer shell structure defining an inner annular space around said shell portions, wall members disposed in said inner annular space extending radially between and longitudinally of said shell structures and defining longitudinal channels, elongated duct members extending intermediate said outer shell structure and said casing in said outer space and defining ducts, material feeding means disposed at one end of said apparatus in feeding relation to said channels, said inner shell portions having slots extending intermediate the central space thereof and said longitudinal channels and said outer shell structure having slots extending intermediate said channels and said ducts, said adjacent ends of said shell portions having transverse walls defining an intermediate space between said shell portions, and said outer cylindrical shell having an inwardly directed baffle plate extending into said intermediate space between said transverse walls, said intermediate space being in communication with said channels and said baffle subdividing each of said channels in two sections and being effective to redistribute the material delivered through the channel sections on one side of said baffle among the channel sections on the other side thereof.

2. Rotary drum apparatus in accordance with claim 1, where said sections on said one side of said baffle constitute a pre-drying zone and said sections on said other side constitute a calcining zone.

3. Rotary drum apparatus in accordance with claim 2, wherein said wall members defining said longitudinal channels present generally smooth surfaces.

4. Rotary drum apparatus in accordance with claim 1, wherein said shells are provided with louvre devices disposed over said slots, that said slots extend longitudinally of the axis of said shells and are provided with inclined closure strips.

5. Rotary drum apparatus in accordance with claim 4, wherein said louvre devices comprise rockable louvre strips pivotally mounted over said slots.

6. Rotary drum apparatus in accordance with claim 5, wherein the pivot axes of said rockable louvre strips are offset from the axes of the centers of gravity of said strips.

7. Rotary drum apparatus in accordance with claim 4, wherein said louvre devices comprise rockable louvre strips pivotally mounted over said slots, said strips having a length greater than the distance between the pivot axes of adjacent strips to permit one strip to extend over another and permitting engagement of one strip by another when rocked to an open position during the rotation of the cylindrical casing.

8. Rotary drum apparatus in accordance with claim 5, wherein said louvre devices comprise rockable louvre strips pivotally mounted over said slots, said strips having a portion resting against the longitudinal edges of said slot for the closed position of said louvre.

9. Rotary drum apparatus in accordance with claim 4, wherein said louvre devices are covered by baffle strip assemblies on the sides of said shells facing said channels.

10. Rotary drum apparatus in accordance with claim 1, wherein said inner cylindrical shell structure is provided at the end opposite the end proximate said material feeding means with vanes adapted to impart a swirling motion to gases entering the space enclosed by said inner shell.

11. Rotary drum apparatus in accordance with claim 1, wherein longitudinal spaces constituting through flow passages are defined intermediate said ducts by said duct members.

References Cited in the file of this patent

UNITED STATES PATENTS

| | | |
|---|---|---|
| 1,948,742 | Andreas | Feb. 24, 1934 |
| 2,020,960 | Pehrson et al. | Nov. 12, 1935 |
| 2,268,296 | Narsted et al. | Dec. 30, 1941 |